(12) United States Patent
Moreno et al.

(10) Patent No.: US 10,876,541 B2
(45) Date of Patent: Dec. 29, 2020

(54) FLUID PUMP

(71) Applicant: DELPHI TECHNOLOGIES IP LIMITED, St. Michael (BB)

(72) Inventors: Daniel J. Moreno, El Paso, TX (US); Francisco Romo, Chihuahua (MX)

(73) Assignee: DELPHI TECHNOLOGIES IP LIMITED

( * ) Notice: Subject to any disclaimer, the term of this patent is extended or adjusted under 35 U.S.C. 154(b) by 171 days.

(21) Appl. No.: 15/937,655

(22) Filed: Mar. 27, 2018

(65) Prior Publication Data
US 2019/0301482 A1 Oct. 3, 2019

(51) Int. Cl.
| F04D 29/18 | (2006.01) |
| F04D 5/00 | (2006.01) |
| F04D 13/06 | (2006.01) |
| F02M 37/08 | (2006.01) |

(52) U.S. Cl.
CPC .......... *F04D 29/188* (2013.01); *F04D 5/008* (2013.01); *F02M 37/08* (2013.01); *F04D 13/0646* (2013.01); *F05D 2240/307* (2013.01)

(58) Field of Classification Search
CPC ............... F04D 29/188; F04D 13/0646; F04D 29/5806; F04D 5/008; H02K 5/145; H02K 5/20; H02K 1/17; F02M 37/08; F05D 2240/307; F05D 2240/14
See application file for complete search history.

(56) References Cited

U.S. PATENT DOCUMENTS

| 2,246,777 | A | * | 6/1941 | Bordeaux | ........... F04D 13/0646 310/86 |
| 2,312,848 | A | * | 3/1943 | Pezzillo | ............. F04D 13/0646 417/356 |
| 2,485,408 | A | * | 10/1949 | Pezzillo | ............. F04D 13/0646 417/357 |
| 2,500,400 | A | * | 3/1950 | Cogswell | ................. F04D 3/02 415/91 |
| 2,747,512 | A | * | 5/1956 | Fouche | ............... H02K 5/1285 417/356 |
| 3,719,436 | A | * | 3/1973 | McFarlin | ........... F04D 13/0646 417/356 |
| 3,723,028 | A | * | 3/1973 | Bottoms | ................ F04D 9/003 417/356 |

(Continued)

FOREIGN PATENT DOCUMENTS

DE 2418536 A * 4/1973

*Primary Examiner* — Nathan C Zollinger
(74) *Attorney, Agent, or Firm* — Joshua M. Haines

(57) ABSTRACT

A fluid pump includes a fluid pump inlet and a fluid pump outlet. A motor includes an armature and a stator such that the armature rotates about an axis. A pump section includes a pump section having a pumping element coupled to the armature such that rotation of the armature rotates the pumping element such that the pumping element pumps fluid from the fluid inlet to a pump section outlet of the pump section. A fluid passage within the fluid pump provides fluid communication from the pump section outlet to the fluid pump outlet such that the armature in part defines the fluid passage. The armature includes blades arranged in a polar array centered about the axis such that each of the blades extends in a helix about the axis and such that the blades define chambers. The chambers are in constant fluid communication with the pump section outlet.

4 Claims, 7 Drawing Sheets

(56) References Cited

U.S. PATENT DOCUMENTS

| | | | | |
|---|---|---|---|---|
| 5,582,510 | A * | 12/1996 | Dobler | F02M 37/08 |
| | | | | 417/423.7 |
| 5,692,886 | A * | 12/1997 | Kobayashi | F04D 13/0646 |
| | | | | 417/423.12 |
| 5,951,262 | A * | 9/1999 | Hartman | F04D 1/06 |
| | | | | 417/356 |
| 6,068,454 | A * | 5/2000 | Gaston | F04D 3/02 |
| | | | | 416/241 A |
| 6,454,547 | B1 * | 9/2002 | Kohlhaas | F04D 3/02 |
| | | | | 417/353 |
| 6,824,361 | B2 * | 11/2004 | Yu | F04D 29/188 |
| | | | | 415/55.1 |
| 10,184,475 | B2 * | 1/2019 | Fischer | F04D 13/0653 |
| 10,711,793 | B2 * | 7/2020 | Romo | H02K 1/17 |
| 2014/0314591 | A1 | 10/2014 | Herrera et al. | |
| 2017/0363052 | A1 * | 12/2017 | Lin | F02M 51/04 |
| 2019/0301482 | A1 | 10/2019 | Moreno et al. | |
| 2019/0301483 | A1 | 10/2019 | Romo et al. | |

* cited by examiner

FLUID PUMP

TECHNICAL FIELD OF INVENTION

The present invention relates to a fluid pump; more particularly to a fluid pump with an electric motor; and even more particularly to a fluid pump with features of an armature of the electric motor which increase efficiency of the fluid pump.

BACKGROUND OF INVENTION

Fluid pumps, and more particularly fuel pumps for pumping fuel, for example, from a fuel tank of a motor vehicle to an internal combustion engine of the motor vehicle, are known. U.S. Pat. No. 6,824,361 to Yu et al. shows a typical electric fuel pump which includes an impeller located axially between stationary inlet and outlet plates. Rotation of the impeller by an electric motor pumps fuel to an outlet of the fuel pump such that an armature of the electric motor is located in the flow path taken by the fuel in order for the fuel to reach the outlet of the fuel pump. Consequently, the armature is an impedance to the flow of fuel, thereby reducing the efficiency of the fuel pump and increasing the energy needed to pump fuel. While the fuel delivery system for an internal combustion engine has not historically been concerned with energy consumption, the efforts to make internal combustion engines, and the vehicles with which they are included, even more efficient has brought the fuel pump into view as an area to improve efficiency.

What is needed is a fluid pump which minimizes or eliminates one or more of the shortcomings as set forth above.

SUMMARY OF THE INVENTION

Briefly described, a fluid pump includes a fluid pump inlet which introduces fluid into the fluid pump; a fluid pump outlet which discharges fluid from the fluid pump; a motor within the fluid pump, the motor having an armature and a stator such that the stator surrounds the armature, wherein one of the armature and the stator includes a plurality of windings which when energized with electricity cause the rotor to rotate about an axis; a pump section, the pump section having a pumping element coupled to the armature such that rotation of the armature in a first rotational direction about the axis rotates the pumping element such that the pumping element pumps fluid from the fluid inlet to a pump section outlet of the pump section; and a fluid passage within the fluid pump which provides fluid communication from the pump section outlet to the fluid pump outlet, wherein the armature in part defines the fluid passage. The armature includes a plurality of blades arranged in a polar array centered about the axis such that each of the plurality of blades extends in a helix about the axis and such that the plurality of blades define a plurality of chambers such that a respective one of the plurality of chambers is between respective adjacent pairs of the plurality of blades, wherein each of the plurality of chambers is in constant fluid communication with the pump section outlet. The plurality of blades provides the benefit of reducing impedance provided by the armature to the flow of fuel, thereby increasing efficiency, increasing flow, decreasing torque, and decreasing energy consumption.

BRIEF DESCRIPTION OF DRAWINGS

This invention will be further described with reference to the accompanying drawings in which.

DETAILED DESCRIPTION OF INVENTION

Figure 1:
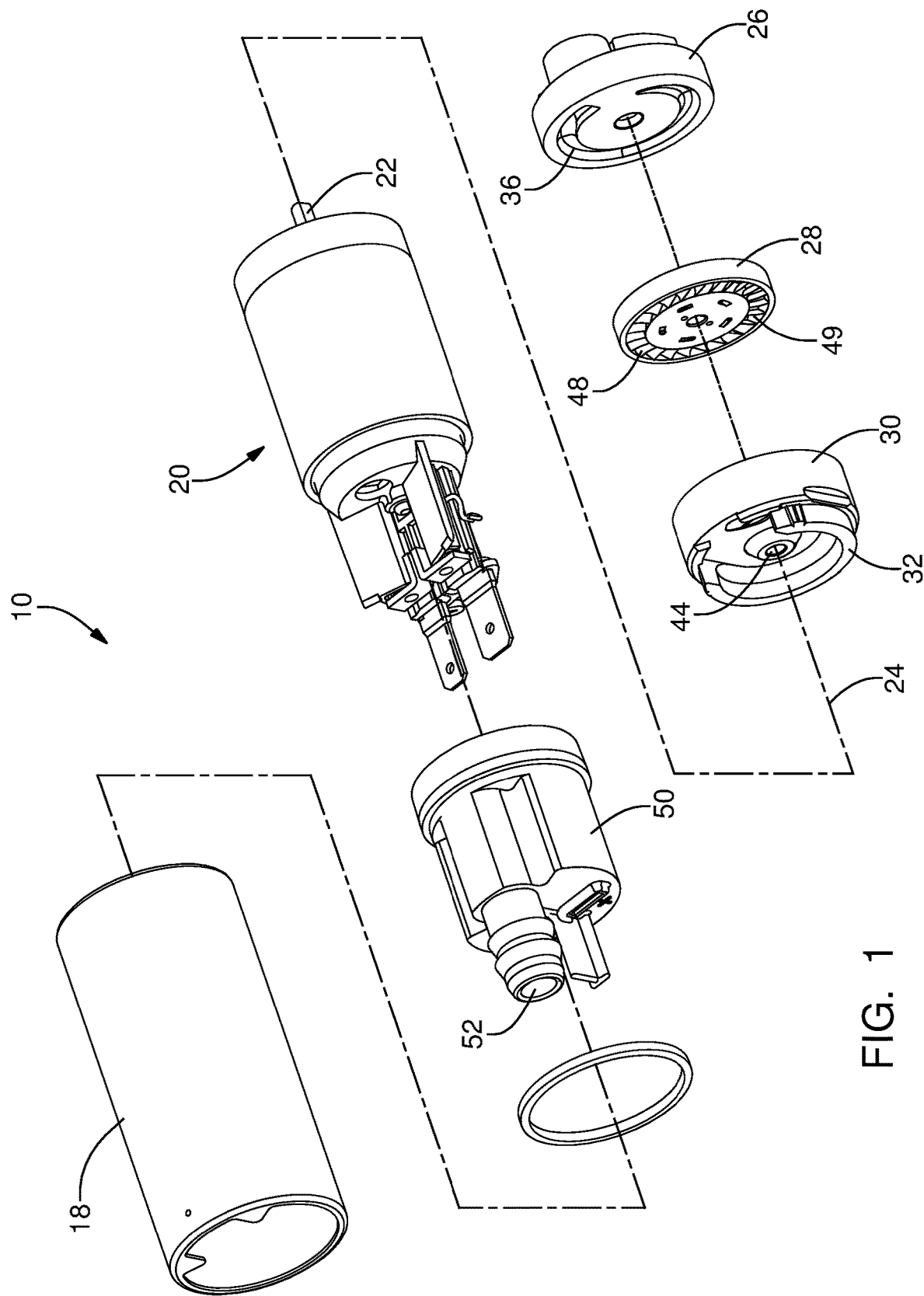
FIG. 1 is an exploded isometric view of a fluid pump in accordance with the present invention.
Figure 2:
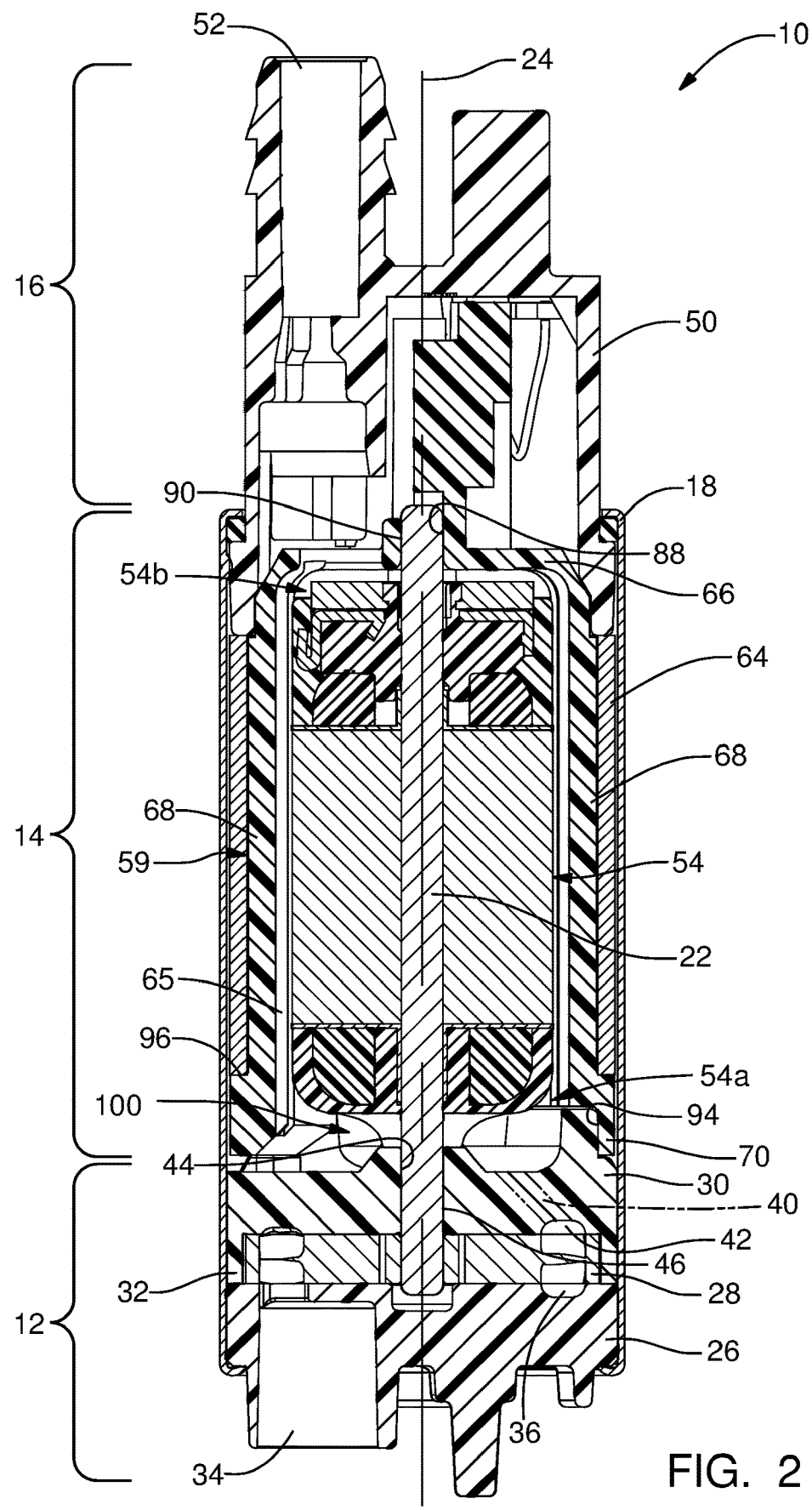
FIG. 2 is an axial cross-sectional view of the fluid pump in accordance with the present invention.
Figure 3:
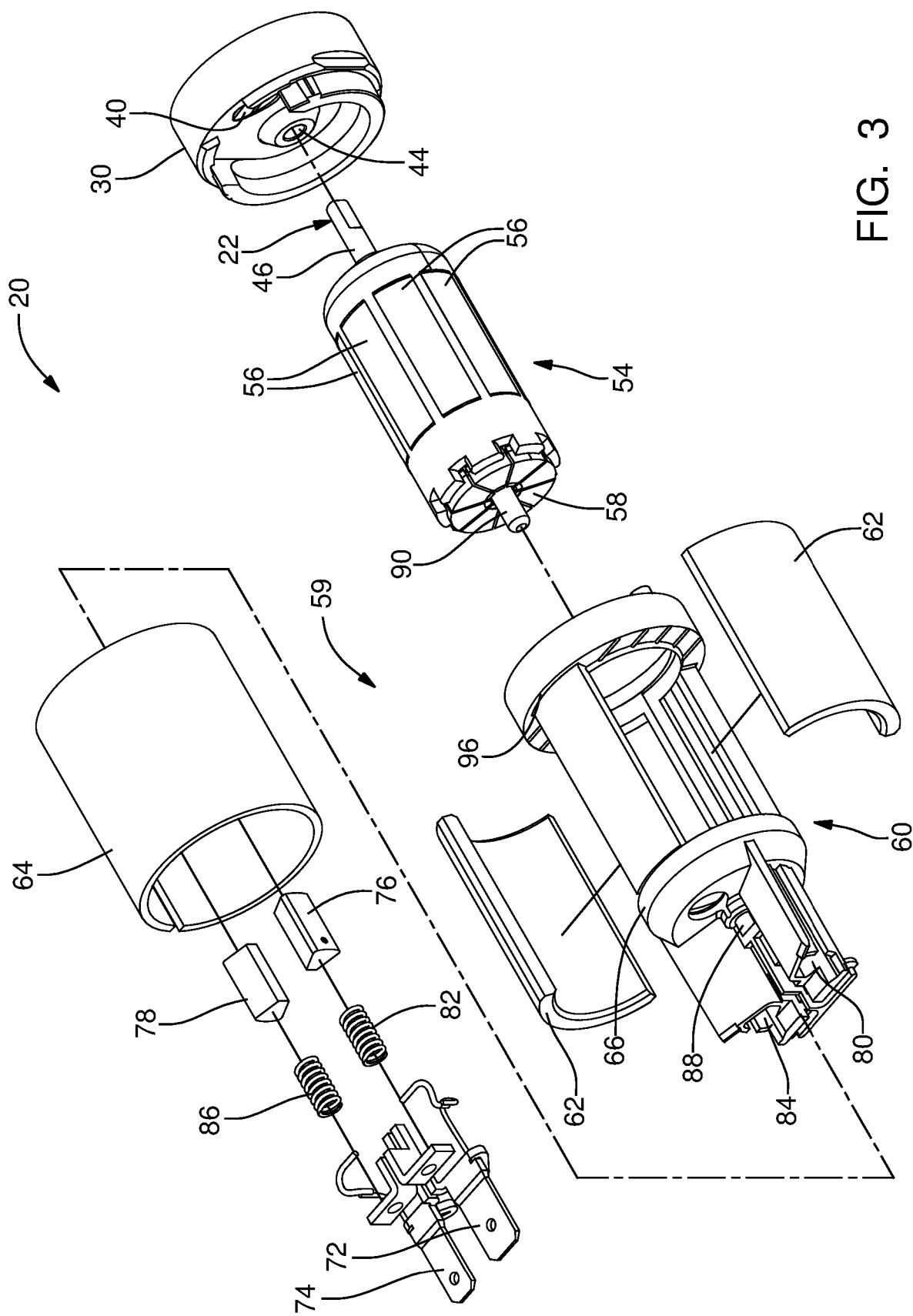
FIG. 3 is an exploded isometric view of a portion of the fluid pump in accordance with the present invention.
Figure 5:
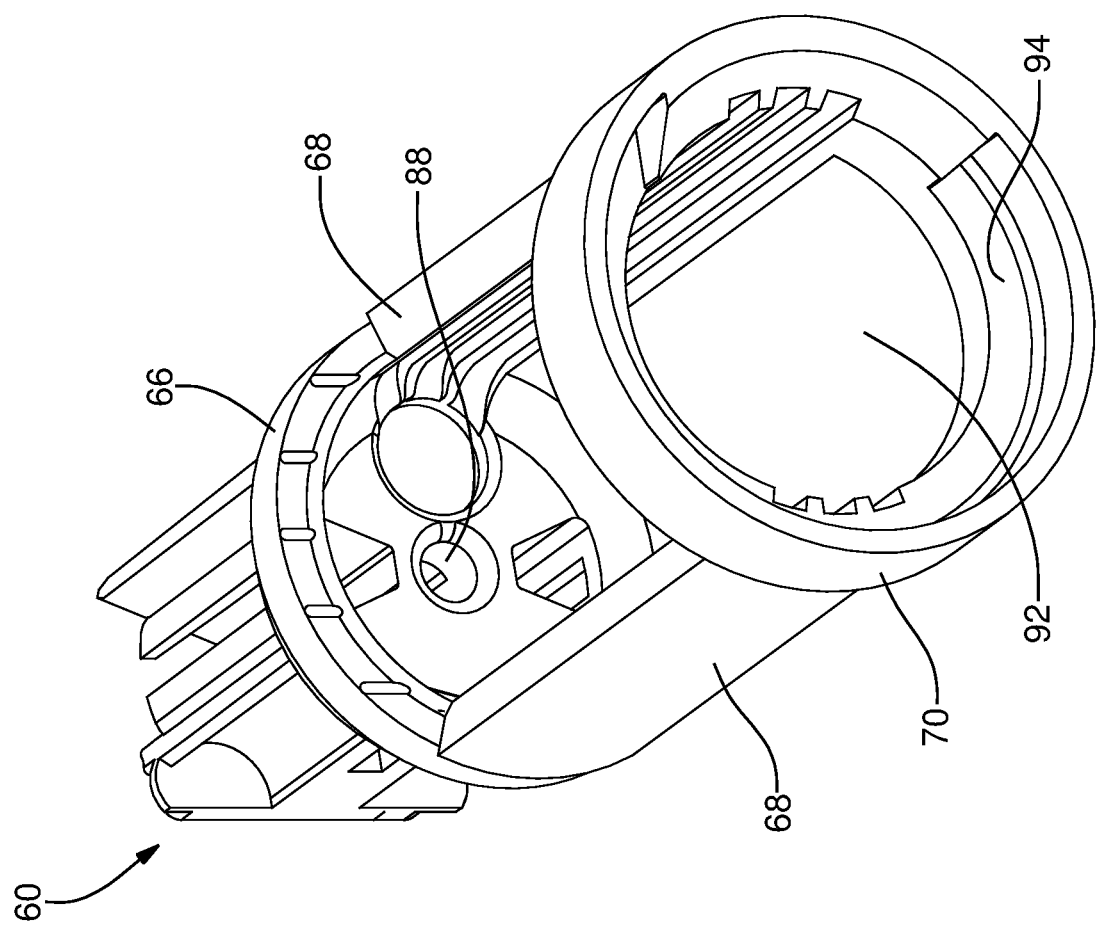
FIG. 5 is an isometric view of the motor frame of FIG. 4, now shown in a different orientation.
Figure 4:
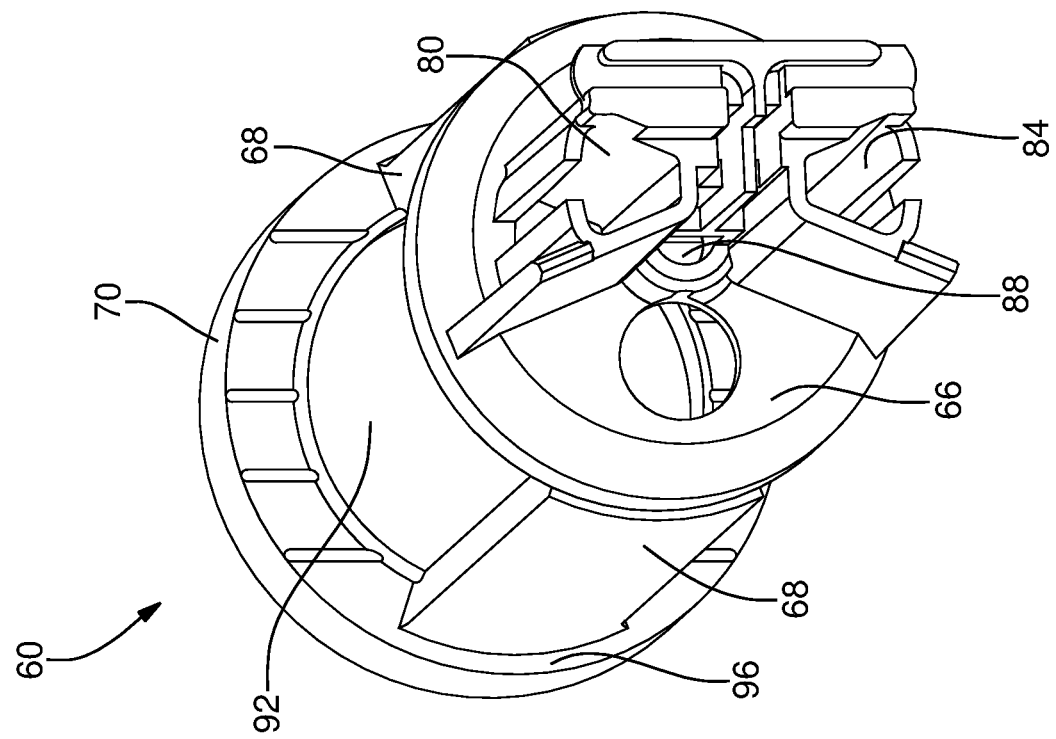
FIG. 4 is an isometric view of a motor frame of the fluid pump in accordance with the present invention.
Figure 6:
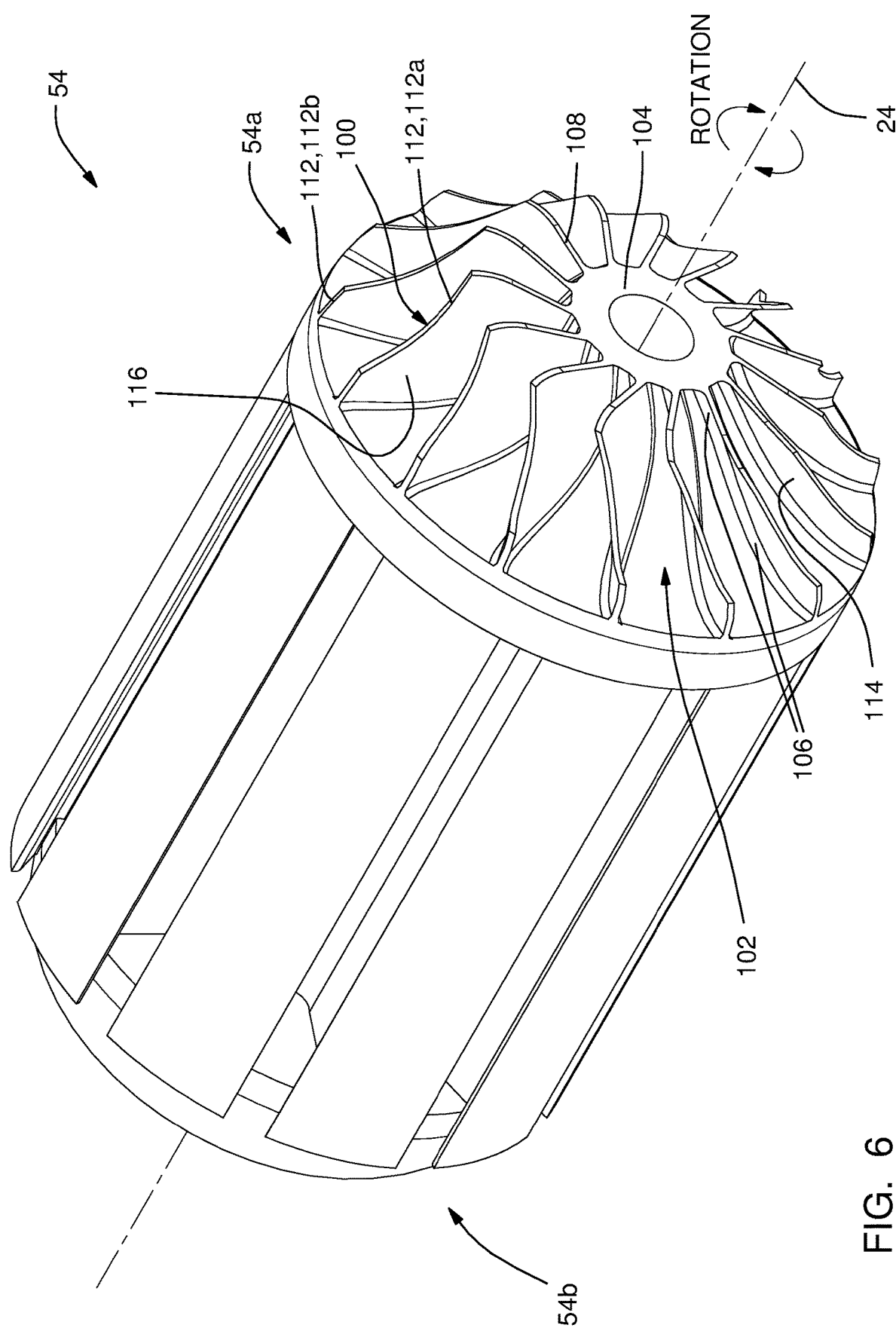
FIG. 6 is an isometric view of an armature of the fuel pump in accordance with the present invention.

Reference will first be made to FIGS. 1 and 2 which are an exploded isometric view and an axial cross-sectional view respectively of a fluid pump illustrated as fuel pump 10 for pumping liquid fuel, for example gasoline, from a fuel tank (not shown) to an internal combustion engine (not shown). While the fluid pump is illustrated as fuel pump 10, it should be understood that the invention is not to be limited to a fuel pump, but could also be applied to fluid pumps for pumping fluids other than fuel. Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18. Electric motor 20 includes a shaft 22 extending therefrom into pump section 12. Shaft 22 rotates about an axis 24 when an electric current is applied to electric motor 20. Electric motor 20 will be described in greater detail later.

With continued reference to FIGS. 1 and 2, pump section 12 includes an inlet plate 26, a pumping element illustrated as impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of axis 24, i.e. the dimension of spacer ring 32 in the direction of axis 24 is greater than the dimension of impeller 28 in the direction of axis 24. In this way, inlet plate 26, outlet plate 30, and spacer ring 32 are fixed within housing 18, for example by crimping the axial ends of housing 18. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While the pumping element has been illustrated as impeller 28, it should now be understood that other pumping elements may alternatively be used, by way of non-limiting example only, a gerotor, gears, or roller vanes. Furthermore, while spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet 34 that extends through inlet plate 26 in the same direction as axis 24. Inlet 34 is a passage which introduces fuel into fuel pump 10. Inlet plate 26 also includes an inlet plate flow channel 36 formed in the face of inlet plate 26 that faces toward impeller 28. Inlet plate flow channel 36 is in fluid communication with inlet 34.

Outlet plate 30 is generally cylindrical in shape and includes an outlet plate outlet passage 40 that extends through outlet plate 30 in the same direction as axis 24 where it should be noted that outlet plate outlet passage 40 is an outlet for pump section 12. Outlet plate outlet passage 40 is in fluid communication with outlet section 16 as will be describe in more detail later. Outlet plate 30 also includes an outlet plate flow channel 42 formed in the face of outlet plate 30 that faces toward impeller 28. Outlet plate flow channel 42 is in fluid communication with outlet plate outlet passage 40. Outlet plate 30 also includes an outlet plate aperture, hereinafter referred to as lower bearing 44, extending through outlet plate 30. Shaft 22 extends through lower bearing 44 in a close fitting relationship such that shaft 22 is able to rotate freely within lower bearing 44 and such that radial movement of shaft 22 within lower bearing 44 is limited to the manufacturing tolerances of shaft 22 and lower bearing 44. In this way, lower bearing 44 radially supports a lower end 46 of shaft 22 that is proximal to pump section 12.

Impeller 28 includes a plurality of impeller blades 48 arranged in a polar array radially surrounding and centered about axis 24 such that impeller blades 48 are aligned with inlet plate flow channel 36 and outlet plate flow channel 42. Impeller blades 48 are each separated from each other by an impeller blade chamber 49 that passes through impeller 28 in the general direction of axis 24. Impeller 28 may be made, for example only, by a plastic injection molding process in which the preceding features of impeller 28 are integrally molded as a single piece of plastic.

Outlet section 16 includes an end cap 50 having an outlet 52 for discharging fuel from fuel pump 10. Outlet 52 may be connected to, for example only, a conduit (not shown) for supplying fuel to an internal combustion engine (not shown). Outlet 52 is in fluid communication with outlet plate outlet passage 40 of outlet plate 30 for receiving fuel that has been pumped by pump section 12.

With continued reference to FIGS. 1 and 2 and with additional reference to FIGS. 3-6, electric motor 20 includes a rotor or armature 54 with a plurality of circumferentially spaced motor windings 56, and a commutator portion 58 where shaft 22 extends in each direction from armature 54 such that armature 54 rotates about axis 24. Armature 54 extends from a first axial end 54a that is proximal to pump section 12 to a second axial end 54b that is distal from pump section 12. Electric motor 20 also includes a stator 59 with a motor frame 60, a pair of permanent magnets 62, and a flux carrier 64. Each magnet 62 is in the shape of a segment of a hollow cylinder. Stator 59 circumferentially surrounds armature 54 such that a fluid passage 65 is defined radially between armature 54 and stator 59 and such that fuel flows axially through fluid passage 65 from inlet 34 to outlet 52. Motor frame 60 includes a top section 66 that is proximal to outlet section 16, a plurality of circumferentially spaced legs 68 extending axially from top section 66 toward pump section 12, and a base section 70 axially spaced apart from top section 66 by legs 68. Top section 66, legs 68, and base section 70 are preferably integrally formed from a single piece of plastic, for example only, by a plastic injection molding process.

Top section 66 of motor frame 60 includes a first electrical terminal 72 and a second electrical terminal 74 extending therefrom and protruding through end cap 50. First electrical terminal 72 and second electrical terminal 74 are arranged to be connected to a power source (not shown) such that first electrical terminal 72 and second electrical terminal 74 are opposite in polarity. First electrical terminal 72 and second electrical terminal 74 may be disposed within pre-formed openings in top section 66 or first electrical terminal 72 and second electrical terminal 74 may be insert molded with top section 66 when motor frame 60 is formed by a plastic injection molding process. First electrical terminal 72 is in electrical communication with a first carbon brush 76 while second electrical terminal 74 is in electrical communication with a second carbon brush 78. First carbon brush 76 is disposed within a first brush holder 80 that is defined by top section 66 and is urged into contact with commutator portion 58 of armature 54 by a first brush spring 82 that is grounded to end cap 50. Second carbon brush 78 is disposed within a second brush holder 84 defined by top section 66 and is urged into contact with commutator portion 58 of armature 54 by a second brush spring 86 that is grounded to end cap 50. First carbon brush 76 and second carbon brush 78 deliver electrical power to motor windings 56 via commutator portion 58, thereby rotating armature 54 and shaft 22 about axis 24 in use.

Top section 66 of motor frame 60 defines an upper bearing 88 therein which radially supports an upper end 90 of shaft 22 that is proximal to outlet section 16. Shaft 22 is able to rotate freely within upper bearing 88 such that radial movement of shaft 22 within upper bearing 88 is limited to the manufacturing tolerances of shaft 22 and upper bearing 88.

Legs 68 are preferably equally circumferentially spaced around top section 66 and base section 70 and define motor frame openings 92 between legs 68. Motor frame openings 92 extend axially from top section 66 to base section 70. One magnet 62 is disposed within each motor frame opening 92 and magnets 62 may be inserted within respective motor frame openings 92 after motor frame 60 has been formed. Alternatively, magnets 62 may be insert molded with motor frame 60 when motor frame 60 is formed by a plastic injection molding process. In this way, magnets 62 and legs 68 radially surround armature 54. While two legs 68 and two magnets 62 have been illustrated, it should be understood that other quantities of legs 68 and magnets 62 may be used.

Base section 70 may be annular in shape and connects legs 68 to each other. Base section 70 includes a base section recess 94 extending axially thereinto from the end of base section 70 that faces away from top section 66. Base section recess 94 is coaxial with upper bearing 88 and receives outlet plate 30 closely therein such that radial movement of outlet plate 30 within base section recess 94 is substantially prevented. Since base section recess 94 is coaxial with upper bearing 88, a coaxial relationship is maintained between lower bearing 44 and upper bearing 88 by base section 70. Base section 70 also defines an annular shoulder 96 that faces toward top section 66. Annular shoulder 96 may be substantially perpendicular to axis 24.

Flux carrier 64 is made of a ferromagnetic material and may take the form of a cylindrical tube. Flux carrier 64 closely radially surrounds legs 68 of motor frame 60 and magnets 62. Flux carrier 64 may be made, for example only, from a sheet of ferromagnetic material formed to shape by a rolling process. The end of flux carrier 64 that is proximal to base section 70 of motor frame 60 axially abuts annular should 96 of base section 70 while the end of flux carrier 64 that is proximal to top section 66 of motor frame 60 axially abuts a portion of end cap 50 that radially surrounds top section 66 of motor frame 60. In this way, flux carrier 64 is captured axially between end cap 50 and annular shoulder 96 of base section 70.

Since motor frame 60 may be made as a single piece, for example only, by a plastic injection molding process, upper bearing 88 and base section recess 94 can be made by a single piece of tooling, thereby allowing a high degree of control over the relative positions of upper bearing 88 and base section recess 94. Consequently, lower bearing 44 can more easily be maintained in a coaxial relationship with upper bearing 88. Similarly, since first brush holder 80 and second brush holder 84 may be defined by top section 66, for example only, by an injection molding process, first brush holder 80, second brush holder 84, and upper bearing 88 may be formed by a single piece of tooling, thereby allowing a high degree of control over the relative positions of first brush holder 80, second brush holder 84, and upper bearing 88. Consequently, first brush holder 80 and second brush holder 84 can be easily maintained parallel to axis 24 which may be important for first carbon brush 76 and second carbon brush 78 to adequately interface with commutator portion 58 of armature 54.

In operation, inlet 34 is exposed to a volume of fuel (not shown) which is to be pumped to, for example only, an internal combustion engine (not shown). An electric current is supplied to motor windings 56 in order to rotate shaft 22 and impeller 28. As impeller 28 rotates, fuel is drawn through inlet 34 into inlet plate flow channel 36. Impeller blade chambers 49 allow fuel from inlet plate flow channel 36 to flow to outlet plate flow channel 42. Impeller 28 subsequently discharges the fuel through outlet plate outlet passage 40 and consequently through outlet 52.

As may best be visualized in FIG. 2, fuel that is discharged from outlet plate outlet passage 40 (shown in phantom lines in FIG. 2 since outlet plate outlet passage 40 would not otherwise be visible in this section) must flow around armature 54, and in this way, armature 54 impedes flow of fluid from outlet plate outlet passage 40 to outlet 52. Now with particular reference to FIG. 6, in order to decrease the impedance provided by armature 54, thereby increasing the efficiency of fuel pump 10, armature 54 is provided with a plurality of armature blades 100 at first axial end 54a such that armature blades 100 are arranged in a polar array centered about axis 24 and such that armature blades 100 extend in a helix about axis 24. It should be noted that shaft 22 is not shown in FIG. 6 for clarity. Armature blades 100 define a plurality of armature chambers 102 such that a respective armature chamber 102 is defined by respective adjacent pairs of armature blades 100 such that each armature chamber 102 is in constant fluid communication with outlet plate outlet passage 40. Armature blades 100 are fixed to armature 54, for example by being integrally formed therewith in a plastic overmolding operation or by being formed separately and subsequently fixed thereto by adhesives, interference fit, or mechanical fasteners. Consequently, armature blades 100 rotate together with armature 54. In operation, armature 54 rotates clockwise as oriented in FIG. 6 in order to cause impeller 28 to pump fluid from inlet 34 to outlet plate outlet passage 40. Armature blades 100 are configured to direct fluid radially outward from armature chambers 102 to fluid passage 65 radially between armature 54 and stator 59 when rotated clockwise as oriented in FIG. 6.

Each armature blade 100 extends outward from a central hub 104 which is centered about axis 24 such that central hub 104 increase in diameter in a direction moving toward second axial end 54b. An intersection of each armature blade 100 with central hub 104 defines a root edge 106 of armature blade 100 which is inclined relative to axis 24 and such that root edge 106 is helical in shape and flares outward in a direction moving toward second axial end 54b. Each armature blade 100 is bounded by root edge 106, a leading edge 108, and a tip edge 112, where tip edge 112 may include a first tip edge 112a and a second tip edge 112b. Leading edge 108 extends from the end of root edge 106 that is proximal to pump section 12 to one end of first tip edge 112a while one end of second tip edge 112b extends from the other end of root edge 106. The other end of second tip edge 112b intersects with the end of first tip edge 112a that is opposite the end of first tip edge 112a that intersects with leading edge 108. As such, each armature blade 100 includes a leading face 114 which is bounded by root edge 106, leading edge 108, first tip edge 112a, and second tip edge 112b such that leading face 114 faces into the direction of rotation of armature 54 during operation, i.e. clockwise as viewed in FIG. 6. As shown, leading face 114 may be non-planar. Furthermore, each armature blade 100 includes a trailing face 116 which is bounded by root edge 106, leading edge 108, first tip edge 112a, and second tip edge 112b such that trailing face 116 faces into the direction opposite of rotation of armature 54 during operation, i.e. counterclockwise as viewed in FIG. 6.

In the preceding description of armature blades 100 and relating features, only one of each respective feature has been labeled in the drawings for clarity. For example, only one leading face 114 of one armature blade 100 has been labeled with the understanding that each armature blade 100 includes a similar feature.

The Inventors have calculated that a fluid pump which includes armature blades 100 will benefit from increased pumping efficiency, increased flow, reduced torque, and reduced pressure pulsations. Without being bound by theory, the Inventors believe that the improved performance produced by including armature blades 100 is the result of armature blades 100 affecting a boundary layer, i.e., the space of viscous fluid that is between armature 54 and free moving fluid. More particularly, the Inventors believe that the improved performance results from armature blades 100 reducing the thickness of the boundary layer.

Figure 7:
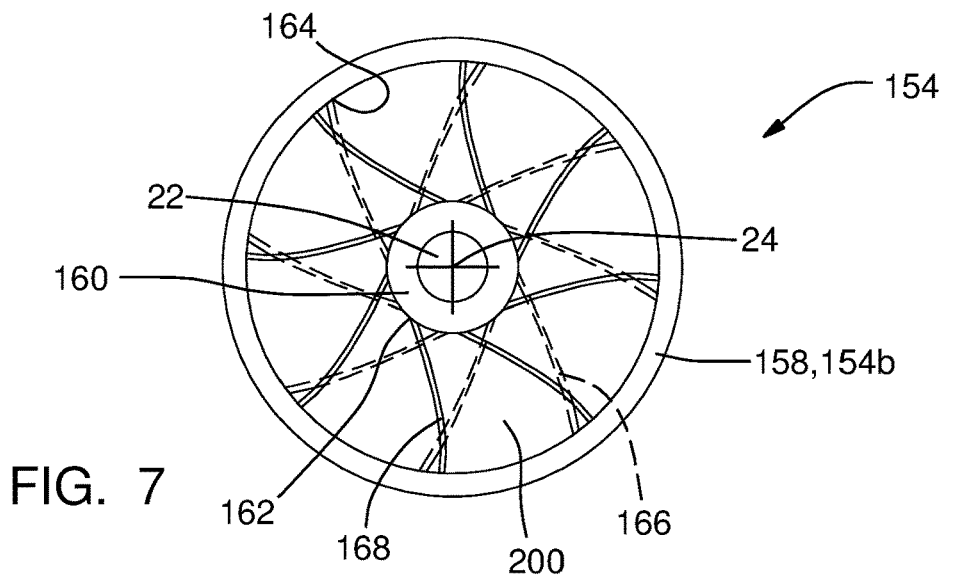
FIG. 7 is an end view of another armature of the fuel pump in accordance with the present invention.
Figure 8:
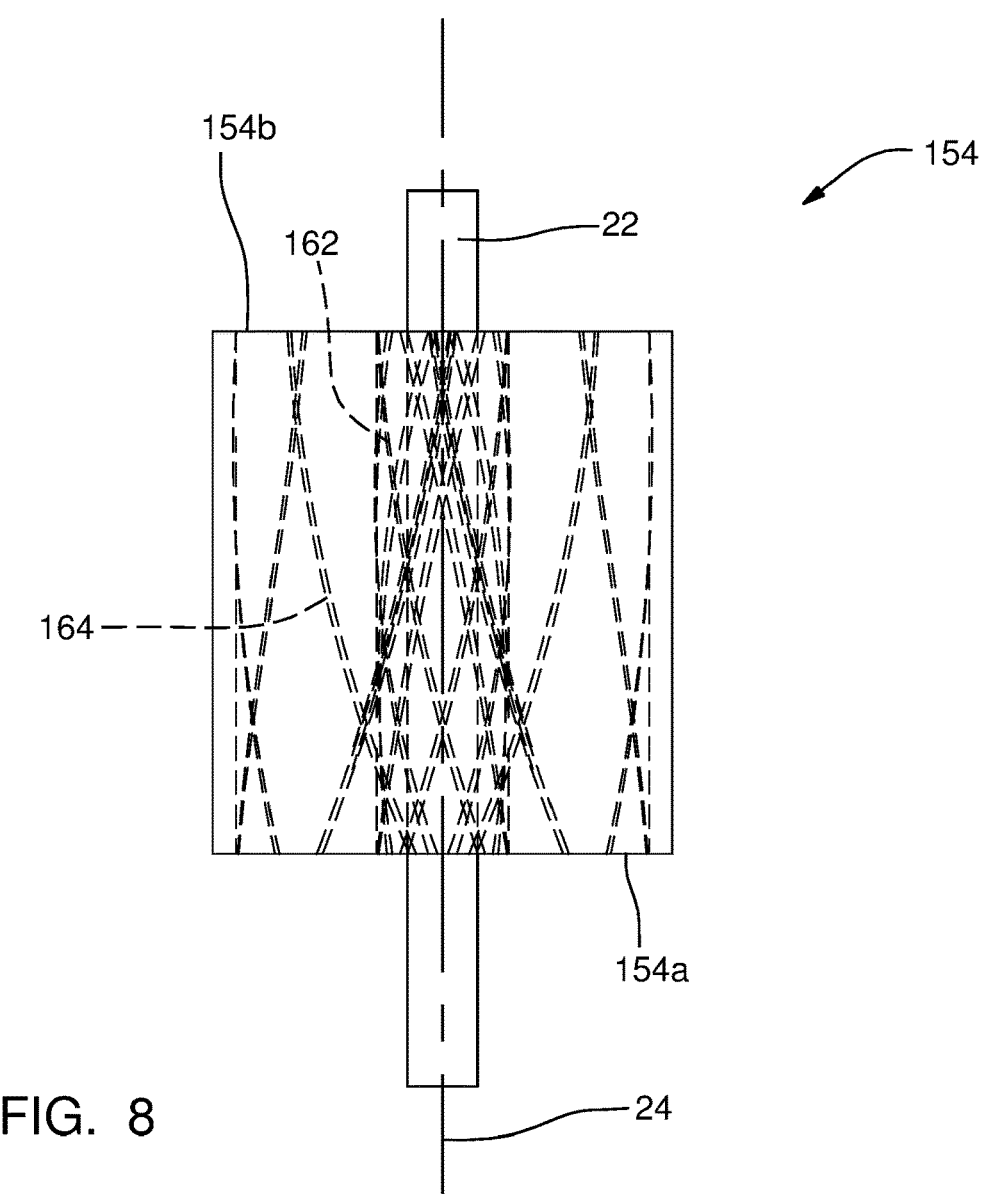
FIG. 8 is a side view of the armature of FIG. 7.
Figure 9:
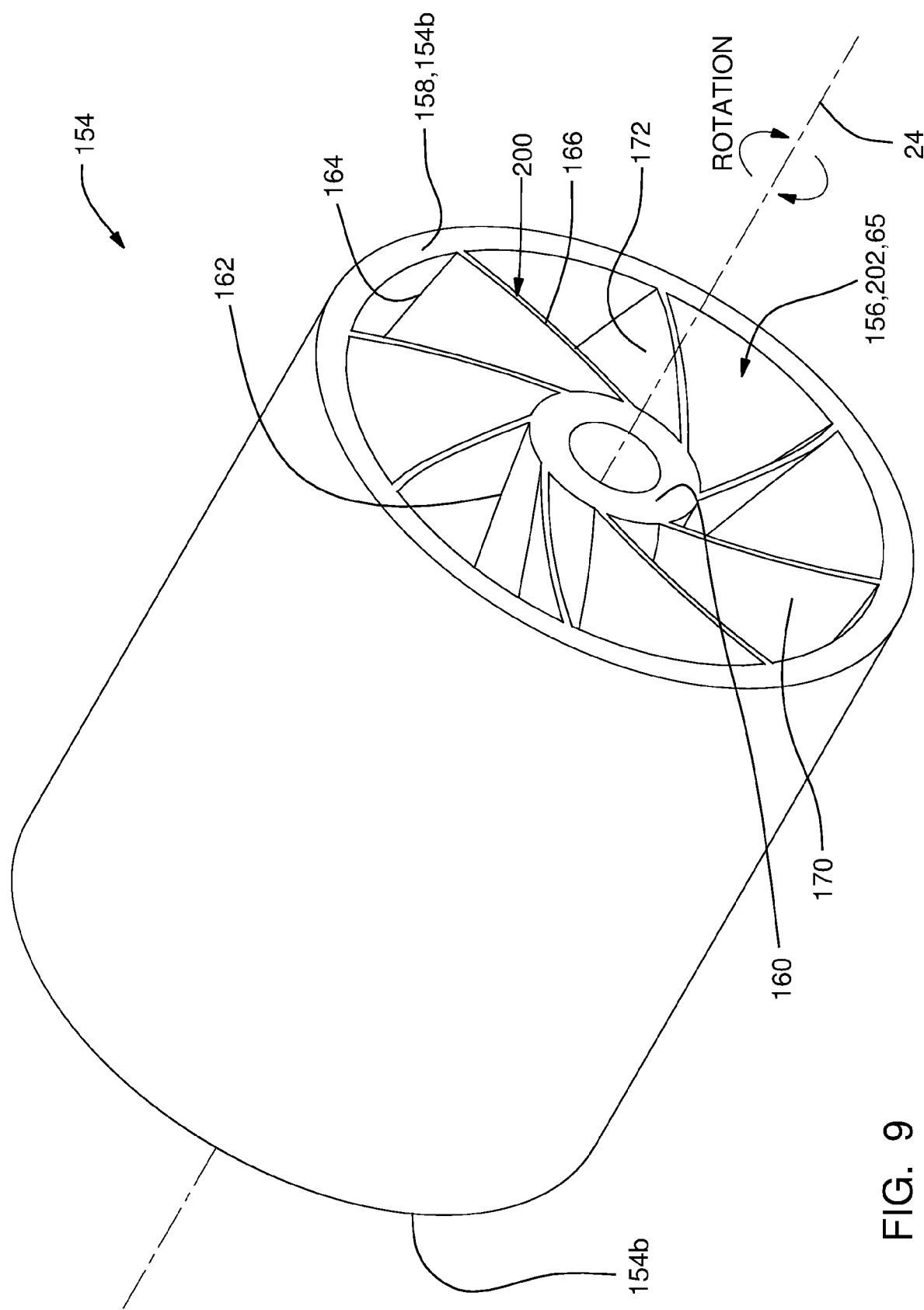
FIG. 9 is an isometric view of the armature of FIGS. 7 and 8.

In an alternative arrangement, which may be particularly suited to a fuel pump which includes a brushless DC motor, attention will now turn to FIGS. 7-9 where an armature 154 as an alternative to armature 54 is illustrated. Armature 154, unlike armature 54, includes a hollow portion 156 extending axially therethrough, i.e. hollow portion 156 enters a first armature end 154a at one axial end thereof (proximal to pump section 12) and exits a second armature end 154b at the other axial end thereof (distal from pump section 12), such that hollow portion 156 in part defines fluid passage 65. Armature 154 includes an annular portion 158 within which hollow portion 156 is located. Armature 154 also includes a central hub 160 located radially inward from annular portion 158 such that central hub 160 is centered about and extends along axis 24. Shaft 22 is fixed to central hub 160 such that rotation between shaft 22 and central hub 160 is prevented where it should be noted that shaft 22 has been omitted from FIG. 9 for clarity. In order to decrease the impedance provided by armature 154, thereby increasing the efficiency of fuel pump 10, armature 154 is provided with a plurality of armature blades 200 within hollow portion 156 which are configured to propel fluid through hollow portion 156. Armature blades 200 are arranged in a polar array centered about axis 24 and extend outward from central hub 160 to annular portion 158 such that armature blades 200 extend in a helix about axis 24. Armature blades 200 define a plurality of armature chambers 202 such that a respective armature chamber 202 is defined by respective adjacent pairs of armature blades 200 and such that each armature chamber 202 is in constant fluid communication with outlet plate outlet passage 40. Armature blades 200 each intersect, and are attached to, central hub 160 at a root edge 162 and intersect, and are attached to, annular portion 158 at a tip edge 164 such that each armature blade 200 extends from a leading edge 166 proximal to pump section 12 to a trailing edge 168 distal from pump section 12. As such, each armature blade 200 includes a leading face 170 which is bounded by root edge 162, tip edge 164, leading edge 166, and trailing edge 168 that faces into the direction of rotation of armature 154 during operation, i.e. clockwise as viewed in FIG. 9. As shown, leading face 170 may be non-planar. Furthermore, each armature blade 200 includes a trailing face 172 which is bounded by root edge 162, tip edge 164, leading edge 166, and trailing edge 168 that faces the direction opposite of rotation of armature 154 during operation, i.e. counterclockwise as viewed in FIG. 9. For clarity, it should be understood that leading edge 166 and trailing edge 168 that have been labeled in FIG. 7 correspond to the same armature blade 200. Armature blades 200 are fixed to annular portion 158 and central hub 160, for example, by being integrally formed therewith in a plastic overmolding operation or by being separately formed and subsequently fixed thereto by adhesives, interference fit, or mechanical fasteners. Consequently, armature blades 200 rotate together with armature 154. In operation, armature 154 rotates clockwise as oriented in FIG. 9 in order to cause impeller 28 to pump fluid from inlet 34 to outlet plate outlet passage 40. Armature blades 200 are configured to propel fluid axially through hollow portion 156 from armature chambers 202 when rotated clockwise as oriented in FIG. 9 my virtue of their helical shape.

In the preceding description of armature blades 200 and relating features, only one of each respective feature has been labeled in the drawings for clarity. For example, only one leading face 170 of one armature blade 200 has been labeled with the understanding that each armature blade 200 includes a similar feature.

Armature 54 and armature 154 as described herein with armature blades 100 and armature blades 200 respectively aid in reducing the resistance of armature 54 and armature 154 respectively. In this way, the efficiency of fuel pump 10 is increased, thereby decreasing energy consumption.

While this invention has been described in terms of preferred embodiments thereof, it is not intended to be so limited, but rather only to the extent set forth in the claims that follow.

We claim:

1. A fluid pump comprising:
   a fluid pump inlet which introduces fluid into said fluid pump;
   a fluid pump outlet which discharges fluid from said fluid pump;
   a motor within said fluid pump, said motor having an armature and a stator such that said stator surrounds said armature, wherein one of said armature and said stator includes a plurality of magnets and the other of said armature and said stator includes a plurality of windings which when energized with electricity cause said armature to rotate about an axis;
   a pump section, said pump section having an inlet plate and an outlet plate which are fixed to prevent relative movement therebetween, said pump section also having a pumping element disposed axially between the inlet plate and the outlet plate and the pumping element being coupled to said armature such that rotation of said armature in a first rotational direction about said axis rotates said pumping element such that said pumping element pumps fluid from said fluid pump inlet to a pump section outlet of said pump section which is formed through said outlet plate; and
   a fluid passage within said fluid pump which provides fluid communication from said pump section outlet to said fluid pump outlet, wherein said armature in part defines said fluid passage;
   wherein said armature includes a plurality of blades arranged in a polar array centered about said axis such that each of said plurality of blades extends in a helix about said axis and such that said plurality of blades define a plurality of chambers such that a respective one of said plurality of chambers is between respective adjacent pairs of said plurality of blades, wherein each of said plurality of chambers is in constant fluid communication with said pump section outlet;
   wherein said fluid passage is radially between said plurality of magnets and said plurality of windings and said plurality of blades is configured to direct fluid radially outward from said plurality of chambers to said fluid passage radially between said plurality of magnets and said plurality of windings based on rotation of said plurality of blades in said first rotational direction about said axis.

2. A fluid pump as in claim 1, wherein:
   each of said plurality of blades extends outward from a central hub that is centered about said axis; and
   an intersection of each of said plurality of blades and said central hub defines a root edge which is inclined relative to said axis.

3. A fluid pump as in claim 2, wherein said root edge is helical in shape.

4. A fluid pump as in claim 1, wherein said pump section outlet is axially aligned with said plurality of blades.

* * * * *